(12) United States Patent
Hunt

(10) Patent No.: US 10,460,500 B1
(45) Date of Patent: Oct. 29, 2019

(54) GLYPH RENDERING IN THREE-DIMENSIONAL SPACE

(71) Applicant: Facebook Technologies, LLC, Menlo Park, CA (US)

(72) Inventor: Warren Andrew Hunt, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/953,014

(22) Filed: Apr. 13, 2018

(51) Int. Cl.
*G06T 15/00* (2011.01)

(52) U.S. Cl.
CPC .................. *G06T 15/005* (2013.01)

(58) Field of Classification Search
CPC .................................................. G06T 15/005
USPC ................................................. 345/418, 419
See application file for complete search history.

(56) References Cited

U.S. PATENT DOCUMENTS

| | | | | |
|---|---|---|---|---|
| 8,633,930 | B2 * | 1/2014 | Mansfield | G06T 11/60 345/442 |
| 2008/0084572 | A1 * | 4/2008 | Capper | G06T 11/60 358/1.13 |
| 2008/0238927 | A1 * | 10/2008 | Mansfield | G06T 11/60 345/467 |
| 2010/0073709 | A1 * | 3/2010 | Jones | G06K 15/02 358/1.15 |
| 2014/0043339 | A1 * | 2/2014 | Taylor | G06T 11/203 345/443 |
| 2014/0146073 | A1 * | 5/2014 | Chang | G06T 11/60 345/614 |
| 2014/0320540 | A1 * | 10/2014 | Deach | G06T 3/40 345/666 |

* cited by examiner

*Primary Examiner* — Sarah Lhymn
(74) *Attorney, Agent, or Firm* — Baker Botts L.L.P.

(57) ABSTRACT

In one embodiment, a computing system may determine a pixel area in a display coordinate system and project it into a three-dimensional coordinate system to determine a projected area. Based on the projected area, the system may determine a portion of a data structure that contains an analytical definition of a glyph in a two-dimensional coordinate system. The system may access a portion of the analytical definition associated with the selected portion of the data structure, the portion of the analytical definition defining one or more areas of the glyph. The system may project the portion of the analytical definition into the display coordinate system and compute a coverage proportion of the pixel area that overlaps with one or more areas defined by the projected portion of the analytical definition. Based on the coverage, the system may determine a color for the pixel and render the glyph.

20 Claims, 9 Drawing Sheets

GLYPH RENDERING IN THREE-DIMENSIONAL SPACE

TECHNICAL FIELD

This disclosure generally relates to computer graphics.

BACKGROUND

Computer-generated graphics may include texts, numbers, symbols, or other types of glyphs. The glyphs may be rendered in a three-dimensional (3D) space, such as in virtual reality or augmented reality. As an example, a computer-generated 3D scene may include a document placed on a table, a poster on a wall, a can with a logo, etc. The document, poster, and logo may each contain glyphs. Conventionally, glyphs in 3D scenes are treated and processed like images. For example, a text phrase that is to appear in a 3D scene (e.g., a poster on a wall) would be stored as a texture image with color information at a particular resolution. At rendering time, the rendering engine would sample the texture image to integrate color information associated with the text phrase into the 3D scene. Since the text phrase may need to be rendered on any 3D surface and with any resolution, orientation, and distortion, the resulting display of the text phrase may have undesirable artifacts, such as blurring, aliasing, and other inaccuracies.

SUMMARY OF PARTICULAR EMBODIMENTS

Embodiments described herein provide ways to store and sample glyph information analytically so that glyphs rendered in 3D would appear accurate with minimal or no undesirable artifacts. According to particular embodiments, rather than storing a glyph as an image with a particular resolution (e.g., an image with n-by-m pixels), a rendering system may store an analytical definition that defines the shape of a glyph. Since a glyph's analytical definition is not constrained by any particular resolution, it can be scaled to any size while maintaining sharp, accurate features. Unlike a texture image with fixed, uniformly divided color information, an analytical definition can be transformed (e.g., rotated, sheared, distorted, etc.) without information loss. As such, glyphs that are defined analytically would be resistant to aliasing problems. Another benefit is that the analytical definition of a glyph has much smaller storage and memory footprint compared to texture images, especially since typically a rendering system would need to store the same texture image at different resolutions to accommodate different rendering needs. The reduced storage/memory footprint, in turn, optimizes the time required for reading/writing, processing, and transmitting glyphs. The performance optimizations are especially beneficial for virtual reality (VR) applications to produce VR effects that are realistic and responsive to user movements.

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In a typical computer-graphics rendering pipeline, after solving the visibility problem of determining which primitives (e.g., polygons used for modeling a virtual object) are visible, a rendering engine may then be tasked with determining what colors to display on a display screen. For each pixel on the user's display screen, the rendering engine may determine what color it should present. The particular color presented may depend on several factors, including the viewpoint of the user (commonly represented by or referred to as a virtual camera), the virtual object that is visible from the user's viewpoint through the pixel, lighting, etc.

Figure 1:
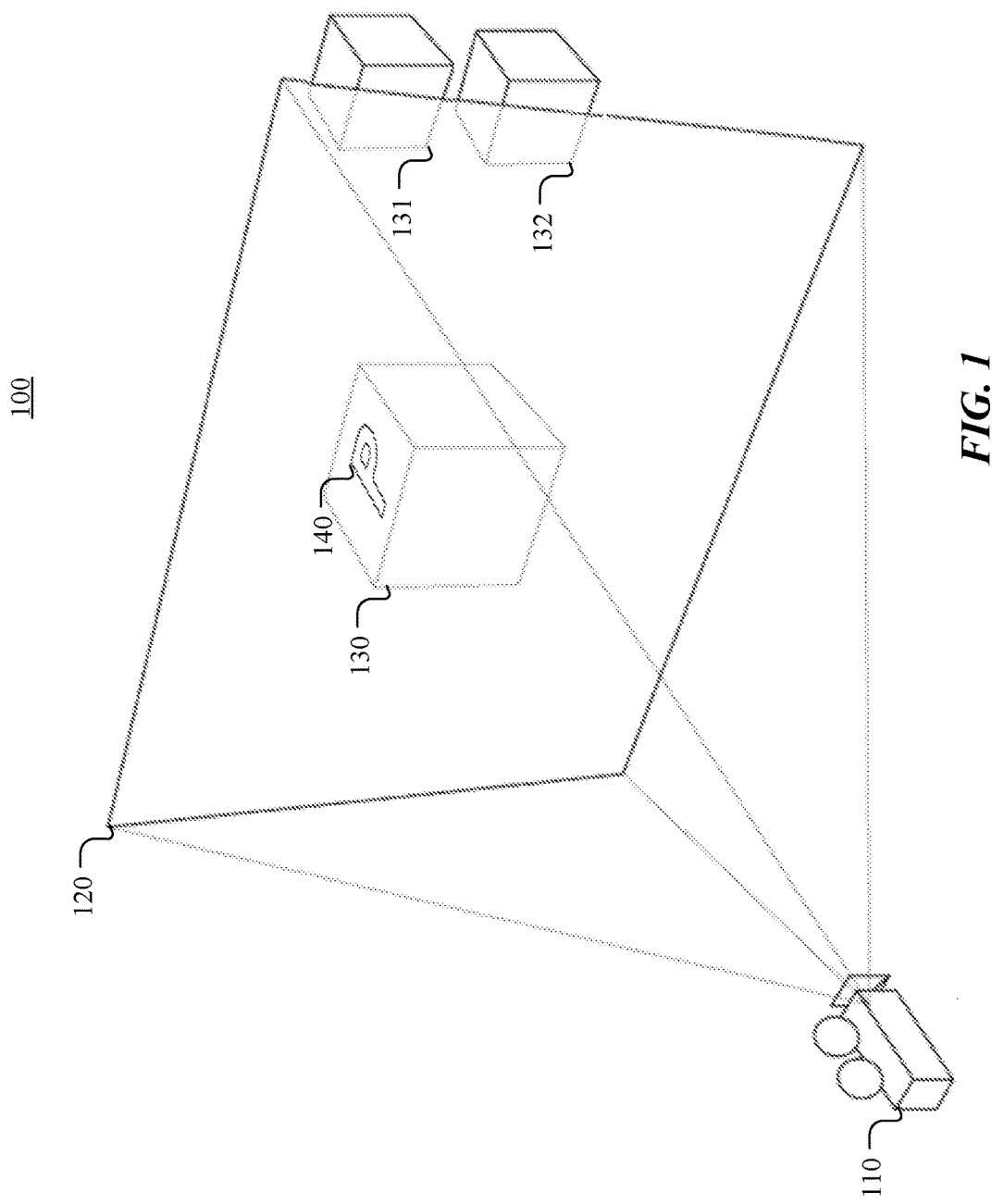
FIG. 1 illustrates conceptual relationships between a virtual camera, a virtual display screen, and virtual 3D objects in a 3D space.

FIG. 1 illustrates conceptual relationships between a virtual camera 110, a virtual display screen 120, and virtual 3D objects 130-132 in a 3D space 100. The 3D space 100 may be a 3D model of an environment and may include any virtual object, such as cars, people, animals, buildings, vegetation, etc. The virtual objects may be defined using primitive shapes, such as triangles, polygons, spheres, cones, iso-surfaces, or any mathematical surface. The 3D model for an object may specify how primitives are interconnected to define the contours of the object. In addition, a 3D object may have a variety of parameters that influence how it appears, including translucency properties, reflective properties colors, and surface textures. For simplicity, FIG. 1 illustrates three objects, namely cubes 130, 131, 132. Cube 130, in particular, is designed to display a glyph 140 (the letter "P") on one of its sides. Although the example in FIG. 1 only illustrates cubes 130-132, one of ordinary skill in the art would recognize that the 3D space 100 may include any type of objects with any glyphs appear in any manner. As an example, a 3D environment may include a 3D table with a document on top that contains glyphs, such as text.

Although the 3D space 100 is defined in 3D, conventional user displays are 2D. Thus, to give a user the illusion that he is viewing a 3D scene, the rendering engine determines what colors to display on the user's 2D display using properties of the virtual 3D model. As previously mentioned, how the 3D scene should appear on the 2D display could depend on the viewpoint from which the 3D scene is observed. Conceptually, the rendering algorithm may represent the viewpoint (which may be that of a user) with a virtual camera 110. Based on the orientation and other properties of the camera 110, the rendering engine may determine a virtual display screen 120 through which the 3D space 100 is observed. The display screen 120, which has a 2D display coordinate system, may act as a virtual window into the 3D space, similar to the physical display of a user device (e.g., a computer monitor, television monitor, smartphone screen, etc.). Therefore, the virtual display screen 120 may be used to represent the user's physical display, including corresponding pixel areas that map to the physical pixels of the physical display. Using the relative positions between each pixel area in the virtual display screen 120 and the virtual camera 110, the rendering engine may determine which portion of which object(s) in the 3D scene would be visible to the viewer through that pixel area. In particular embodiments, the rendering system may project a conceptual ray (or line of sight) from the viewpoint 110, through the particular pixel area in the virtual display screen 120, into the 3D space 100 and see what 3D objects/primitives intersect with the ray. The rendering engine may then compute the appropriate color that the pixel area should present based on properties of the portion that intersects with the ray.

The objects in a 3D space 100 may be defined to have particular texture. This is typically done using texture mapping. For example, a scene's designer may want a 3D scene to include a basketball. The basketball may be defined using a sphere. To make the sphere look like a basketball, the designer may indicate that a texture image should be used to determine the surface color of the sphere. The texture image, for example, may be a 2D image with the color and patterns of a typical basketball. Each segment or primitive that makes up the sphere may be mapped to a particular portion of the texture image. At rendering time, the rendering engine may determine that a ray cast through a pixel area intersects with a portion of the basketball and look up the corresponding color information from the texture image. If text should appear on the basketball as well (e.g., a logo), the text may be stored as a texture image as well and sampled during rendering.

As previously noted, storing a glyph (e.g., letter, number, symbol, etc.) as a texture image has limitations, especially when the rendered scene is for virtual reality (VR) displays. Storing a glyph as a 2D texture image means that the glyph is being defined by a uniform grid of colors (e.g., an image with 100×100 resolution means it is defined by 10,000 pixels). The uniform grid of colors of the texture image of a glyph may naturally map to a 2D display screen that also has a uniform pixel grid, such as when a document is being displayed on a screen (i.e., when the respective normal vectors of the document and the display are parallel). However, when a texture image is rendered in a 3D scene, the texture image would typically undergo some form of distortion and would rarely be uniformly projected onto a display screen. For example, even if a texture is mapped onto a flat table in a 3D scene, when it is projected to the display screen (e.g., conventional flat screens, curved screens, VR headsets or optics, etc.), portions of the texture that are closer to the viewer would appear larger due to the parallax effect. In addition, the display screen and/or the surface on which the glyph is mapped may not always be uniform. For example, a VR headset's display may use curved display lenses and 3D objects in a VR scene may have any shape and size. Furthermore, since VR applications typically aim to provide users with a realistic virtual world, the VR applications may allow its users a wide degree of freedom to explore the virtual world. This means that the user may perceive virtual scenes, including the objects and glyphs within, from a wide range of viewpoints, orientations, and distances. Consequently, a glyph, as it appears on the 2D display, may be distorted in seemingly endless manners and may need to be presented in any resolution (e.g., a user may notice, from a distance, that a document is on a table and decide to walk over to read it). Since the texture image of a glyph may not be uniformly sampled to render the distorted (but realistic) views, the glyphs may appear blurry or have other undesirable rendering artifacts (e.g., aliasing). Moreover, since glyphs such as text have fine feature details and are typically displayed over high-contrast backgrounds, any blurring, aliasing, or other types of rendering artifacts would be easily noticeable and hamper legibility. Although one way to ameliorate the problem with resolution may be to store texture images with a wide range of resolutions for every glyph, doing so is resource intensive (e.g., larger files may negatively impact system resources such as storage, memory, cache, processing, network transmission, etc.). Furthermore, using glyphs in varying resolutions would not typically solve problems related to anisotropy in the rendered footprint. For example, when rendering a glyph covered by an oval-shaped footprint, the rendering system would still have to integrate over that footprint; and when the footprint is very long and thin, problems with rendering artifacts would persist regardless of the glyph's resolution.

Particular embodiments described herein address the aforementioned problems associated with storing glyphs as texture images by using analytical definitions to define glyphs. Since the embodiments do not assume that grids are uniform, the rendered glyphs would appear much crisper, especially in the VR context. In particular embodiments, a rendering system may take as input a particular coordinate of interest (e.g., corresponding to a pixel area on a virtual display screen), which may intersect with a glyph, and determine the color that should be presented. Rather than sampling a texture image of the glyph and returning sampled color information, the rendering system, in particular embodiments, may use the analytical definition of the glyph to compute a percentage or proportion of the requested pixel area that overlaps with the glyph. The computed coverage may then be used to determine the appropriate color for requested color area. Particular embodiments, therefore, allow a glyph to be sampled in its native format, rather than having to wrap or stretch a texture image around an object and then approximate the answer (which leads to undesirable image artifacts, such as aliasing and blurring). Without using such approximation, the result would appear much sharper in any resolution.

Figure 2A:
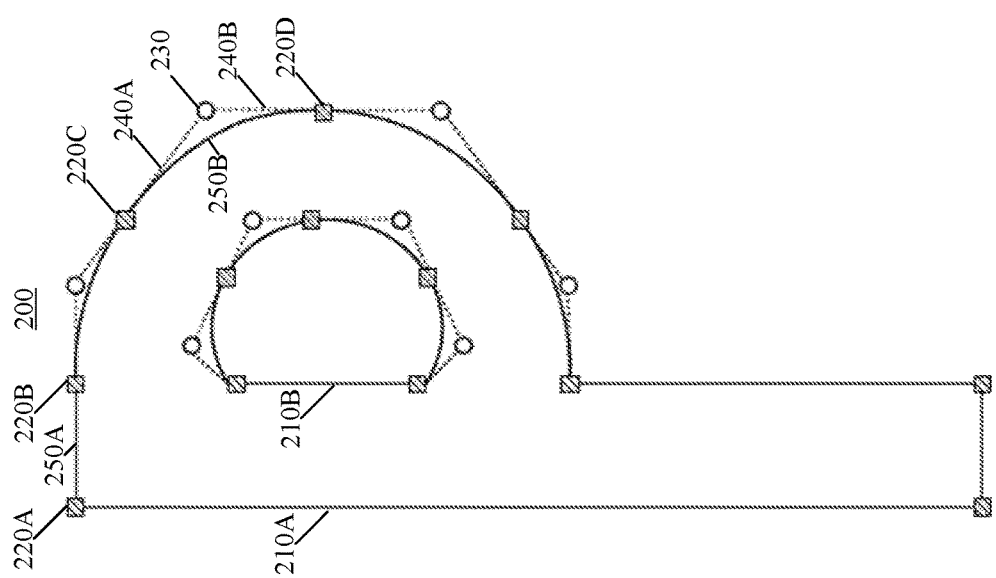
FIGS. 2A-2D illustrate an example of an analytical definition of a glyph.

Particular embodiments define glyphs analytically. FIGS. 2A-2D illustrate an example of an analytical definition of a glyph 200. In the particular example shown, the letter "P" is used, but any other letter, numeral, or symbol may equally be defined using the embodiments. FIG. 2A illustrates the outer edges 210A, 210B of the glyph 200 being defined using on-edge points, represented in the figure as squares (e.g., 220A-D), and off-edge control points, represented in the figure as circles (e.g., 230). Each of the points, whether on-edge points or off-edge control points, may be specified in a 2D coordinate system for the glyph (e.g., as x-y pairs). For example, point 220A and point 220B may have coordinates $(x_1, y)$ and $(x_2, y)$, respectively (they have the same y coordinate). Each on-edge point may be connected to its adjacent on-edge points by edge segments. For example, on-edge point 220A and on-edge point 220B are connected by the edge segment 250A. The edge segment connecting two on-edge points may be a straight line or curved. If two adjacent on-edge points (e.g., 220A and 220B) are not associated with an off-edge control point (e.g., 230), then the two points may be connected by a straight edge segment (e.g., 250A). However, if an edge segment (or the corresponding on-edge points) are associated with an off-edge control point, then the edge segment may be curved. For example, the curved edge segment 250B, which has on-edge points 220C and 220D as endpoints, is associated with the off-edge control point 230 that defines the curvature of the edge segment 250B. Thus, each curved edge segment (e.g., 250B) may be defined by three points: two on-edge points (e.g., 220C and 220D) and one off-edge control point (e.g., 230). The three points define a triangle, which may be used to define exactly one parabola, which in turn defines the curved edge segment (e.g., 250B). The endpoints of the parabola are the on-edge points (e.g., 220C and 220D). As such, the straight line connecting the on-edge points defines the chord of the parabola. The off-edge control point (e.g., 230) and each of the associated control points (e.g., 220C and 220D) define tangents (e.g., 240A and 240B) for the parabola. In this manner, curved edge segments may be defined.

In particular embodiments, the analytical definition for a glyph may be generated by dividing or segmenting the glyph into multiple geometric pieces (e.g., triangles, polygons, etc.). An embodiment of the conceptual process for generating an analytical definition for a glyph will be described with reference to FIGS. 2A-D. The process shows how a glyph, such as the letter "P" 200, may be analytically defined using trapezoids and curve segments.

Figure 2B:
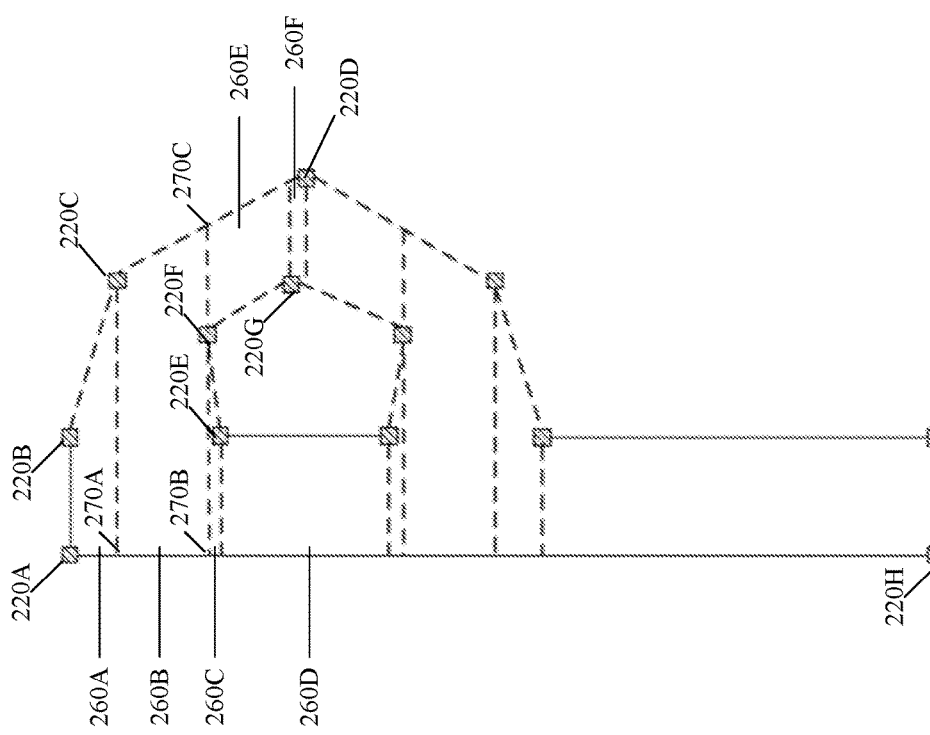

FIG. 2B illustrates a representation of a glyph using only trapezoids. The term "trapezoid," as used herein, refers to a quadrilateral with at least one pair of parallel sides (i.e., it includes a quadrilaterals with exactly one pair of parallel sides and those with exactly two pairs of parallel sides). In particular embodiments, the glyph 200 may represented using the on-edge points (e.g., 220A-H) without the curvatures defined by the off-edge control points. Thus, straight edge segments would connect adjacent on-edge points. The resulting representation of the glyph 200 may be "cut up" into trapezoids, such as 260A-F. In particular embodiments, a horizontal line (e.g., aligned with the x-axis) may be extended from each on-edge point (e.g., 220A-H) to "cut up" the glyph representation. These line extensions may form the parallel bases of the trapezoids 260A-F. The other two sides of each trapezoid 260A-F may be formed by the straight lines between adjacent on-edge points 220A-H. For example, trapezoid 260A may have vertices 220A, 220B, 220C, and 270A. In particular embodiments, at least one of the four vertices is on the glyph's edge (e.g., on-edge point 220C trapezoid 260A and 260B, and on-edge point 220F for trapezoid 260B and 260E). The point 270A is the point of intersection between (1) the edge segment from point 220A to 220H and (2) the horizontal line extending from the on-edge point 220C. Similarly, trapezoid 260B is defined by the vertices 220C, 270A, 270B, and 270C. The point 270B is the point of intersection between (1) the horizontal line extending from the on-edge point 220F and (2) the edge segment from point 220A to 220H. The point 270C is the point of intersection between (1) the horizontal line extending from the on-edge point 220F and (2) the line from 220C to 220D. In an embodiment where the bases of the trapezoids 260A-F are formed by horizontal extensions, the bases would be axis-aligned (e.g., the parallel bases of each trapezoid may be parallel with the x-axis). In particular embodiments, the four vertices of each trapezoid may be defined by six numbers, four x values and two y values: e.g., $(x_1, y_1)$, $(x_2, y_1)$, $(x_3, y_2)$, $(x_4, y_2)$.

Figure 2C:
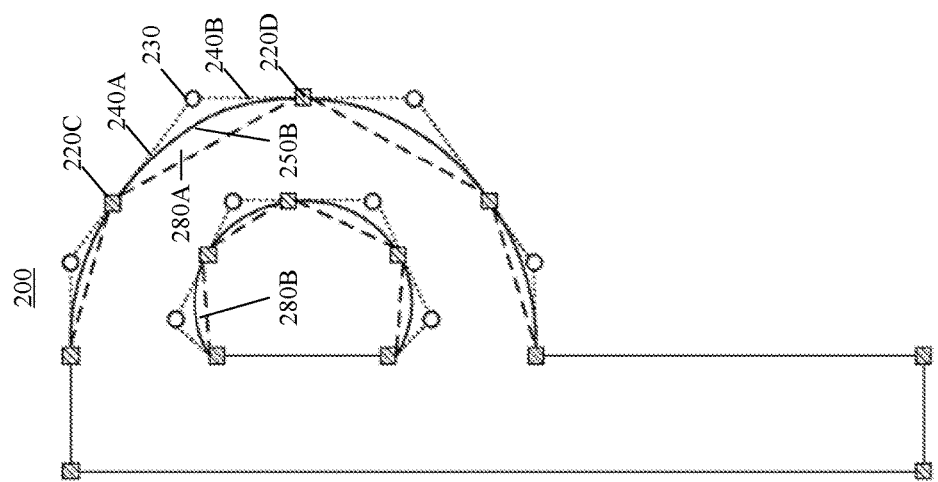

FIG. 2C illustrates how curve segments of the glyph 200 may be analytically defined. Each curve segment (e.g., 280A and 280B) may have a boundary defined by a curved edge segment, which may be interchangeably referred to as an arc or parabola, and a chord that connects the two endpoints of the curved edge segment. For example, the curve segment 280A may be defined by the curved edge segment 250B and the chord connecting endpoints 220C and 220D. As such, each curve segment may be represented by three pairs of x-y coordinates, with two pairs of coordinates respectively defining the two endpoints of the curved edge segment, and the third pair specifying a control point, which as previously described may be used to define the curvature of the curved edge segment. In particular embodiments, each curved edge segment may be defined so that the peaks of the curvature is also the endpoints of the curved edge segment (in other words, there is no maximum within a curve).

Figure 2D:
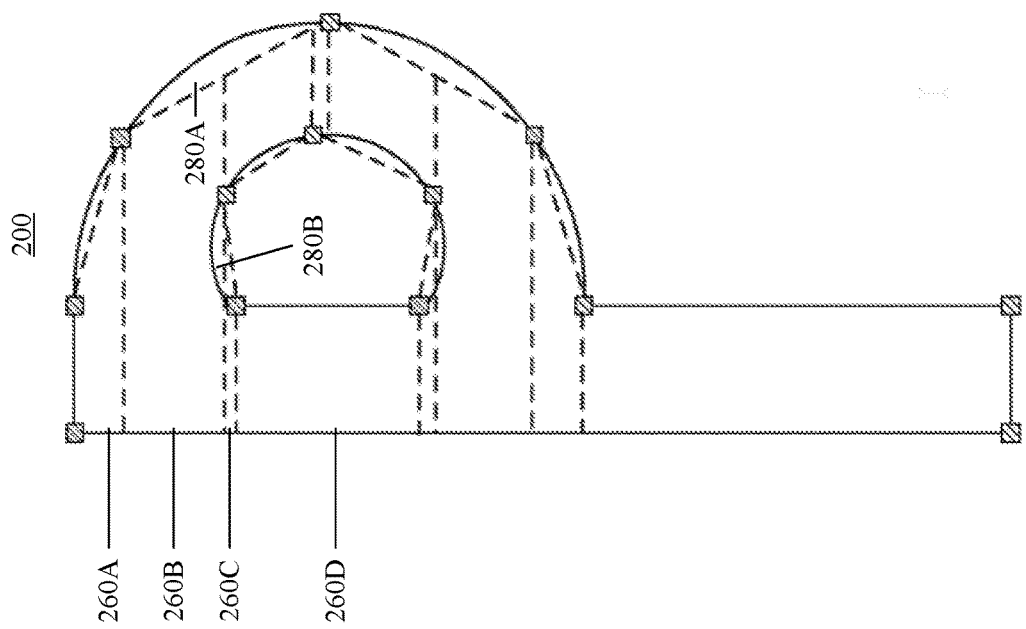

FIG. 2D illustrates the glyph 200 defined using the previously-described trapezoids (e.g., 260A-D) and curve segments (e.g., 280A-B). Some of the curve segments, such as curve segment 280A, may be used additively. For example, as shown in FIG. 2D, the curve segment 280A is added to the assembly of trapezoids to form part of the glyph 200. In other words, additive curve segments define a glyph's coverage area in 2D. Such additive curve segments may define convex portions of the glyph 200. Other curve segments, such as curve segment 280B, is used subtractively. In other words, they define areas that are not covered by the glyph 200. For example, as shown in FIG. 2D, the curve segment 280B is used to carve out a portion of the trapezoids 260B and 260C to form the hole of the letter "P." Such subtractive curve segments may define concave portions of the glyph 200.

In particular embodiments, the geometries (e.g., trapezoids and curve segments) may be stored using a grid-like data structure that conceptually overlaps with the glyph in the two-dimensional space in which the glyph is defined. Each cell in the grid data structure may correspond to an area of the glyph and store analytical definition that is associated with the trapezoid(s) and/or curve segment(s) that overlap with the area. For example, if a cell in the grid corresponds to an area that intersects trapezoid 260B and curve segment 280A, the cell may store the coordinates of the vertices of the trapezoid 260B and curve segment 280A, with an indication that the curve segment 280A is additive. As another example, if a cell corresponds to an area that intersects trapezoid 260B and curve segment 280B, the cell may store the coordinates of the vertices of the trapezoid 260B and curve segment 280B, with an indication that the curve segment 280B is subtractive. The grid data structure may be used as an index to quickly locate the relevant portion of the analytical definition during rendering. The portion of the analytical definition (e.g., particular trapezoids and/or curve segments) intersected by a projected pixel ray may then be used to determine a proportion of the pixel footprint that is covered or overlap with the area defined by the portion of the analytical definition. This coverage information may then be used by the rendering engine to determine the appropriate color information for that pixel.

In particular embodiments, the rendering system may use grids of different resolutions. For example, a lower resolution grid may have cells that cover larger areas of the glyph and a higher resolution grid may have cells that cover smaller areas of the glyph. In particular embodiments, based on the projected pixel size, the rendering system may choose to use a grid resolution that has cell sizes just large enough to fit the projected pixel. In particular embodiments, if a projected pixel covers too many geometries (e.g., when zoomed out), the rendering system may use conventional texture images instead of the analytical definition of the glyph since fine resolution in such a scenario is not needed. The analytical definition embodiments described herein produce much better results compared to the texture image method when pixel spacing (or differentials) is roughly the width of the glyph feature.

Figure 3:
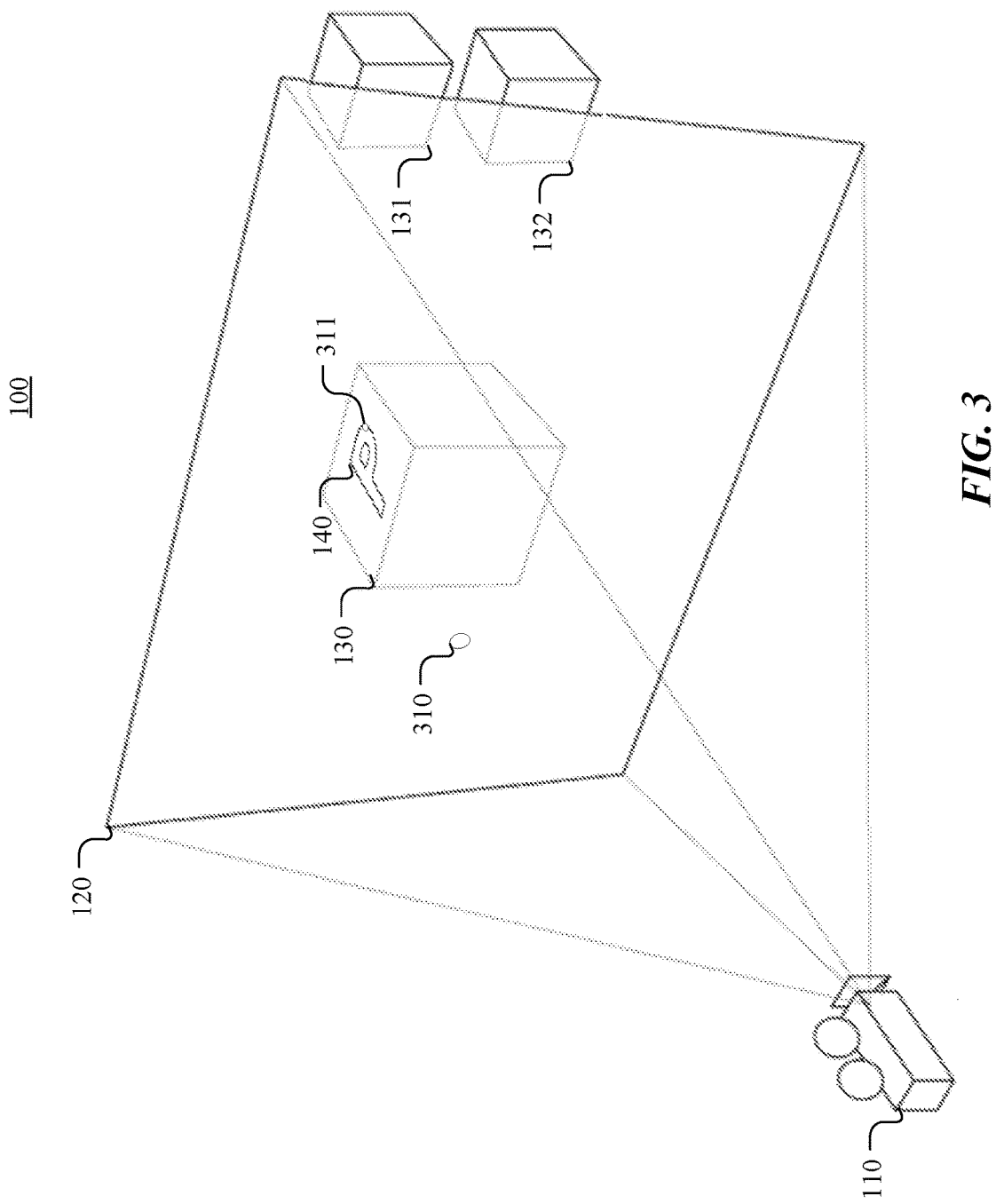
FIG. 3 illustrates a projection of a pixel area into a 3D space.

The analytical definition of a glyph may then be used, in operation, to render the glyph in a computer-generated scene. Particular embodiments of a rendering process, as previously described, may involve determining the color that a particular pixel should display. In particular embodiments, the rendering engine's interface may take as input a pixel coordinate and a differential(s) that defines the pixel's area and output a color that the pixel should display. FIG. 3, for example, illustrates a projection of a pixel area into a 3D space in order to determine the object that the pixel should represent. Based on the position of the virtual camera 110 and the pixel area 310 of interest in the virtual display screen 120, the pixel area 310 may be projected into the 3D space 100. For example, the projection trajectory may be represented by a ray that is projected from the virtual camera 110 and through the pixel area 310. The ray may intersect an object in the 3D space 100, and the point of intersection may be used to compute the color that the pixel should display. Since a pixel of a physical display may physically include different combinations and patterns of red, green, and/or blue light (e.g., a red/green pair or green/blue pair), it may be preferable to represent the pixel as a pixel area rather than a point. In particular embodiments, the pixel area may be a square. In other embodiments, the pixel area may be a circle, which may be defined by a center point and a differential (i.e., the radius). In particular embodiments, the shape and/or size of the pixel area may be defined by the application (e.g., a VR application) making the rendering request to the rendering engine.

The pixel area 310 may be projected to onto any object within the 3D space 100, depending on the trajectory of the ray. As an example, the projection of the pixel area 310 may intersect the top portion of the object 130. The area of intersection may be referred to as the projected area 311. In particular embodiments, the 3D scene may specify that the letter "P" 140 is to appear at the projected area 311. Thus, in particular embodiments, the rendering system may access the stored analytical definition of the glyph "P" to determine what the pixel should display.

Figure 4:
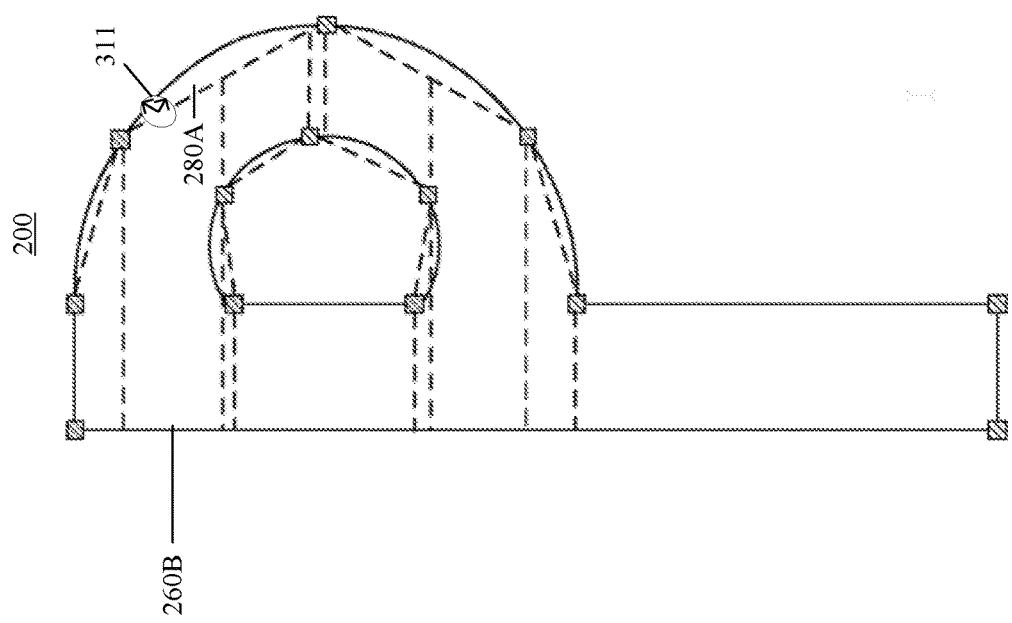
FIG. 4 illustrates a projected pixel being used to sample an analytical definition of a glyph.

FIG. 4 illustrates the projected pixel 311 being used for sampling an analytical definition of "P." In particular embodiments where the pixel area 310 is a circle, its projected area 311 may become an oval (e.g., a Gaussian blob with the oval being at approximately the 2 Sigma line) when it is transformed into the 2D coordinate system of the glyph definition, depending on the angle/orientation of the surface it hits. In particular embodiments, the transformation from the circle to the oval may be represented by a shear and rotation. But since rotation of circle is still a circle, the rotation factor may drop out, leaving the projection transformation to be a shear without rotation. Thus, the transformation of the circle pixel area 310 to the projected oval area 311 may be represented using a shear transformation matrix. While the example shown in FIG. 4 is based on a circular representation of a pixel area, it should be appreciated that other shapes (e.g., square, rectangle, polygon, etc.) may also be used. The particular shape used may be based on, for example, the optics and display-element geometry used in the system. The projection of the pixel may be represented by a transformation of the pixel's shape. For example, if a pixel is represented as a square, its projected area would be a parallelogram.

The oval shape of the projected area 311, in particular embodiments, may be defined by a center coordinate and differentials (e.g., represented as vectors in the 2D coordinate system of the glyph definition). One differential may specify the longer portion of the oval and the other differential may specify the shorter portion. For example, if coordinate of the center point is (u,v), the differentials may be defined as du/dc, dv/dx, du/dy, and dv/dy. In particular embodiments, the pixel area 310 and its projection 311 may represent a single primary color that is supported by a pixel display (e.g., R, G, or B). Since colors with different wavelength behave differently depending on the optical elements employed, in particular embodiments the projected area 311's differentials may be defined as a function of the particular color the pixel is representing.

In particular embodiments, based on the area covered by the projected area 311 in the 2D coordinate system of the glyph, the rendering system may compute a proportion of the projected area 311 that is covered or overlaps with the glyph. In particular embodiments, the rendering system may use the location and coverage information of the projected area 311 to determine which cell(s) of the grid data structure overlaps with the projected area 311. By accessing the cell's associated information, the system may determine which geometric portions of the glyph (e.g., trapezoids and/or curve segments) are relevant to the coverage computation. For example, FIG. 4 shows the projected area 311 intersecting with both the trapezoid 260B and the curve segment 280A. In particular embodiments, the coordinates of the vertices of these shapes may be stored in the cell and used by the rendering system to perform the coverage computation. In particular embodiments, the system may back-project the relevant geometries (e.g., the trapezoid 260B and curve segment 280A) onto the virtual display screen 120 and compare the projected geometries with the unit pixel area 310 (e.g., which may be a circle, a square, etc.), which may simplify the computation (this, in turn, may improve processing efficiency, which is especially important for real-time displays like in VR). As previously described, the transformation of the circular pixel area 310 into the projected area 311 may be based on a shear transformation. Thus, when back-projecting the geometries, an inverse of the shear transformation may be used. This is where one of the benefits of using trapezoids to define the glyph comes in. After shearing a trapezoid, the result is still a trapezoid (albeit with different parameters), since the shear does not affect the y coordinates as a function of the x coordinates. So regardless of the viewing angle or rotation of the pixel area, the relevant trapezoids could always be back-projected into a trapezoid in the pixel space. Due to nice property of the bases of the trapezoids being axis aligned, the trapezoids may be stacked together without any empty spaces, and the ends outside of the pixel area of interest may be easily cut off. This greatly simplifies area computation, which in turn reduces computation time. Furthermore, since trapezoids can cover larger areas than triangles, segmenting a glyph using trapezoids would likely result in fewer number of geometries being computed, compared to embodiments where glyphs are segmented into triangles.

In particular embodiments, the rendering system, using the analytical definitions, may compute the proportion of the pixel area 310 that is covered by or overlaps with the glyph. The coverage information may then be used by any downstream processing unit(s) to generate any desired effects, such as blending between any two colors or values, highlight the glyph's boundaries, determining a color for the pixel, or any other purpose. For example, a shading algorithm may use the coverage information to determine the appropriate color for that pixel. For example, if the glyph is to be black text and the full pixel area 310 is covered by the glyph, then the pixel may be instructed to display black. However, if only half of the pixel area 310 is covered by the glyph, the pixel may be instructed to display gray.

Figure 5:
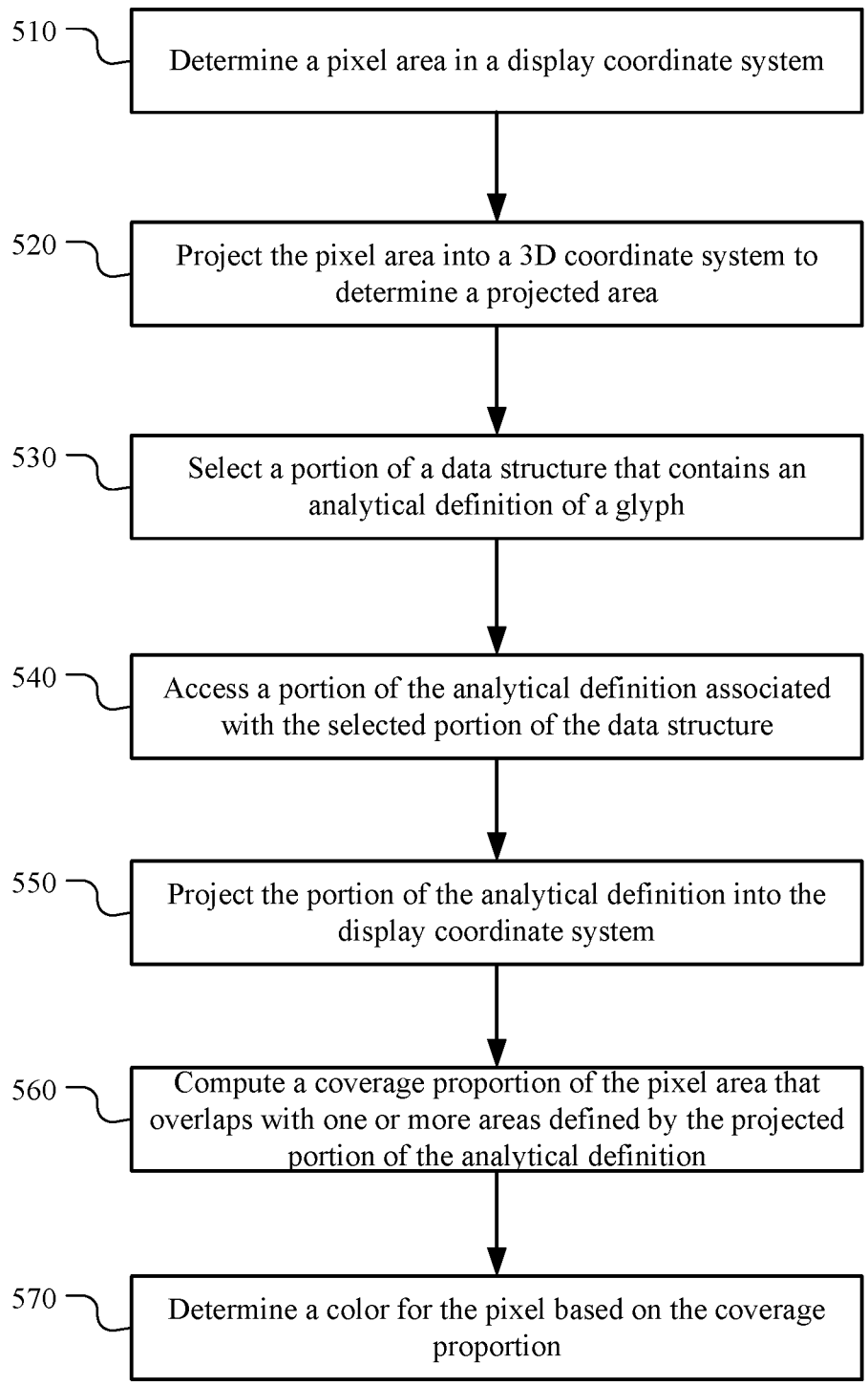
FIG. 5 illustrates a method for determining a color of a pixel using an analytical definition of a glyph.

FIG. 5 illustrates a method, in accordance with particular embodiments, for determining a color of a pixel using an analytical definition of a glyph. The method may begin at step 510, where a computing system running a rendering engine may determine a pixel area in a display coordinate system. This step may be performed as part of the rendering pipeline, during which the rendering engine is tasked with determining the color for each pixel. To determine the color of each pixel, the system may determine the pixel area that is associated with the pixel of interest. As previously described, the pixel area, in particular embodiments, may be defined as a circle in the display coordinate system of a virtual display screen. In other embodiments, the pixel area may be defined as other geometric areas, such as a square, triangle, etc.

At step 520, the system may project the pixel area into a 3D coordinate system to determine a projected area in the 3D coordinate system. In particular embodiments, the projection of the pixel area, defined within the 2D display coordinate system, may be projected into a 3D world that is defined using a 3D coordinate system. In particular embodiments, the trajectory of the projection may be based on the position of the virtual camera (i.e., the point of view) and the location of the pixel area on the 2D virtual display. For example, the projection may follow a straight ray stemming from the virtual camera, through the pixel area, and into the 3D coordinate system. The 3D object that the projected pixel area hits may define the projected area. As an example, if the pixel area in the 2D coordinate system is a circle, its projection onto a surface that is parallel to the ground may cause the associated projected area in the 3D scene to be an oval.

At step 530, the system may select, based on the projected area, a portion of a data structure that contains an analytical definition of a glyph in a two-dimensional coordinate system. For example, the system may determine that the surface in the 3D space (e.g., a side of a cube, a table, a wall, etc.) intersected by the projected area should have a particular glyph (e.g., a letter, numeral, etc.). The 3D scene, for example, may be defined so that particular primitives (e.g., triangles or polygons) are associated with particular glyphs. Upon determining that the projected area intersects such a primitive, the system may then select and access the analytical definition of the associated glyph. In particular embodiments, the analytical definition of the glyph may be in the glyph's own 2D coordinate system. The system may translate the projected area in the 3D space into the 2D coordinate system of the glyph. Using the location of the projected area in the glyph's 2D coordinate system, the system may determine a portion of the glyph's analytical definition that the projected area intersects with. In particular embodiments, a grid data structure may conceptually overlap with the glyph and each cell of the grid may be associated with definitions of the geometries that the particular cell intersects with. For example, each cell may be associated with definitions of trapezoids and/or curve segments of the glyph.

At step 540, the system may access a portion of the analytical definition associated with the selected portion of the data structure. For example, the system may determine that a particular cell of the grid data structure intersects with the projected area. The particular cell may store definitions of geometries (e.g., trapezoids and/or curve segments), which form part of the overall glyph, coinciding with the cell. The system may access the associated portion of the analytical definition defining one or more areas of the glyph, such as the coordinates defining the trapezoids and/or curve segments.

At step 550, the system may project the portion of the analytical definition into the display coordinate system. In particular embodiments, when the system projected the pixel area into the 3D space, it may use a transformation matrix for the projection. When projecting the analytical definition (e.g., coordinates of the vertices of the geometries) back into the display coordinate system, an inverse transformation matrix may be used. In particular embodiments, the analytical definition may be back-projected into a coordinate system where the pixel occupies the area within $[0,1]\times[0,1]$ (in other words, the pixel is within a unit square with corners at (0,0), (0,1), (1,0), and (1,1)). Doing so may simplify the computation of the coverage area because the back-projected area would be normalized to a pixel area of 1. In particular embodiments, the system may skip the step of back-projection (e.g., step 550) and compute the coverage area (e.g., at step 560) using any other means, such as computing the coverage area within the glyph's coordinate system.

At step 560, the system may compute a coverage proportion of the pixel area that overlaps with one or more areas defined by the projected portion of the analytical definition.

As previously described, the analytical definitions may define geometric areas, such as trapezoids, curve segments, triangles, etc. In particular embodiments, the system may assemble or rearrange the geometric areas together and compute the proportion of the pixel is covered by the geometric areas.

At step 570, the system may determine a color for the pixel based on the coverage proportion. For example, if the pixel is deemed to completely overlap with the relevant trapezoids and/or curve segments, the system may simply use the desired glyph color specified by the definition of the 3D scene. For example, if the glyph is supposed to be black, the pixel would display black. However, if the proportion of the pixel that is covered by the glyph is 10%, then the pixel color may be mostly white (if the background is white). If instead the glyph is 50% covered, then the pixel may be a shade of gray. At step 580, the system may, based on the determined color for the pixel, render a display of the glyph. In particular embodiments, the glyph may be rendered as part of a VR scene and displayed through a VR optical display device.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for determining a color of a pixel using an analytical definition of a glyph, including the particular steps of the method of FIG. 5, this disclosure contemplates any suitable method for determining a color of a pixel using an analytical definition of a glyph, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
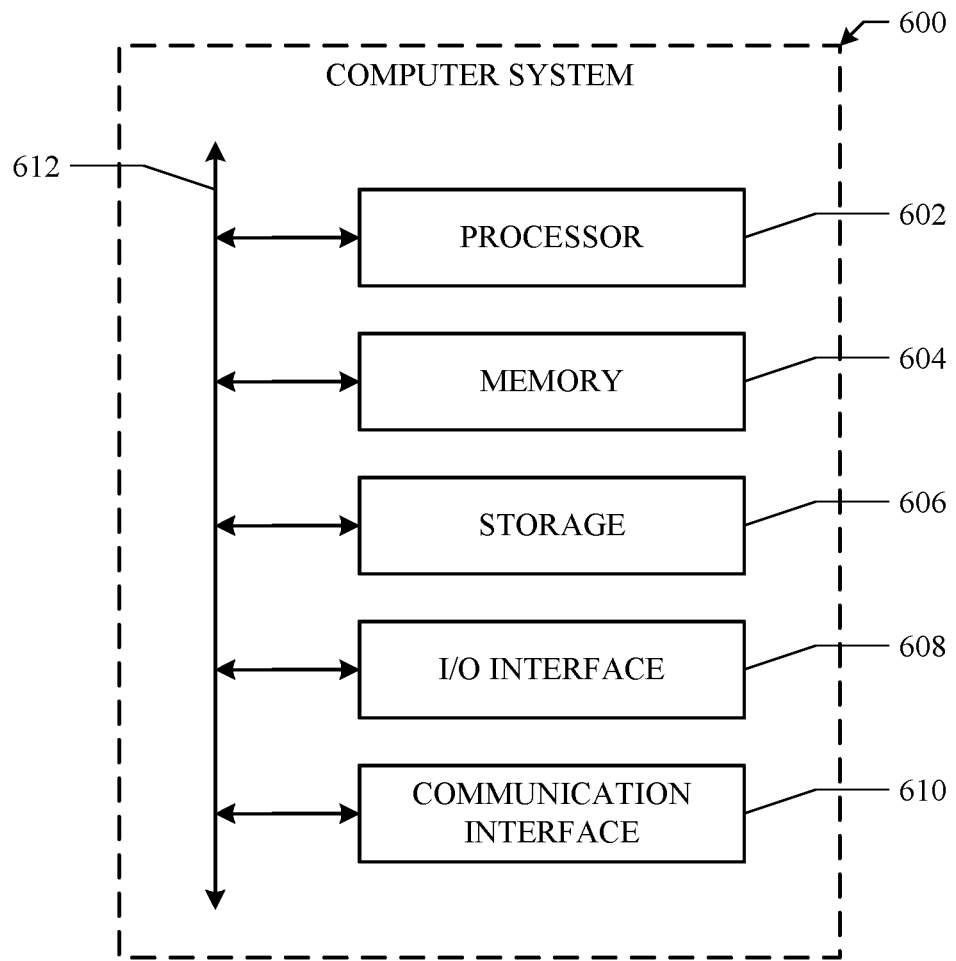
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining a pixel area in a display coordinate system, the pixel area being associated with a pixel;
    projecting the pixel area into a three-dimensional coordinate system to determine a projected area in the three-dimensional coordinate system;
    selecting, based on the projected area, a portion of a data structure that contains an analytical definition of a glyph in a two-dimensional coordinate system;
    accessing a portion of the analytical definition associated with the selected portion of the data structure, the portion of the analytical definition defining one or more areas of the glyph;
    projecting the portion of the analytical definition into the display coordinate system;
    computing a coverage proportion of the pixel area that overlaps with one or more areas defined by the projected portion of the analytical definition;
    determining a color for the pixel based on the coverage proportion; and
    rendering a display of the glyph based on the color.

2. The method of claim 1, wherein the analytical definition comprises definitions for one or more trapezoids having bases that are parallel to each other.

3. The method of claim 2,
    wherein each of the one or more trapezoids is defined based on four vertices; and
    wherein at least one of the four vertices is on the glyph's edge.

4. The method of claim 2, wherein the analytical definition comprises definitions for one or more curve segments, each of which being defined by an arc with two endpoints and a chord connecting the two endpoints.

5. The method of claim 4,
    wherein for each of the one or more curve segments, the associated two points are on the glyph's edge and the associated arc is defined by a point that is off the glyph's edge.

6. The method of claim 4, wherein the glyph is formed by (1) assembling the one or more trapezoids and (2) for each of the one or more curve segments, assembling the curve segment with the one or more trapezoids or removing the curve segment from the one or more trapezoids.

7. The method of claim 4, wherein each of the one or more areas of the glyph defined by the portion of the analytical definition is one of (1) the one or more trapezoids or (2) the one or more curve segments.

8. The method of claim 1,
    wherein the data structure corresponds to a grid that segments the glyph;
    wherein the selected portion of the data structure comprises one or more cells of the grid; and
    wherein the one or more cells of the grid store the portion of the analytical definition.

9. The method of claim 1, wherein the pixel area is circular and is specified by a virtual reality application.

10. The method of claim 1,
    wherein the pixel area is defined by a first center point and one or more first differentials; and
    wherein the projected area is defined by a second center point and one or more second differentials.

11. The method of claim 1, wherein the projected area is determined based on an intersection between the projected pixel area and an object in the three-dimensional coordinate system.

12. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
    determining a pixel area in a display coordinate system, the pixel area being associated with a pixel;
    projecting the pixel area into a three-dimensional coordinate system to determine a projected area in the three-dimensional coordinate system;
    selecting, based on the projected area, a portion of a data structure that contains an analytical definition of a glyph in a two-dimensional coordinate system;
    accessing a portion of the analytical definition associated with the selected portion of the data structure, the portion of the analytical definition defining one or more areas of the glyph;
    projecting the portion of the analytical definition into the display coordinate system;
    computing a coverage proportion of the pixel area that overlaps with one or more areas defined by the projected portion of the analytical definition;

determining a color for the pixel based on the coverage proportion; and rendering a display of the glyph based on the color.

13. The system of claim 12, wherein the analytical definition comprises definitions for one or more trapezoids having bases that are parallel to each other.

14. The system of claim 13, wherein the analytical definition comprises definitions for one or more curve segments, each of which being defined by an arc with two endpoints and a chord connecting the two endpoints.

15. The system of claim 14, wherein the glyph is formed by (1) assembling the one or more trapezoids and (2) for each of the one or more curve segments, assembling the curve segment with the one or more trapezoids or removing the curve segment from the one or more trapezoids.

16. The system of claim 14, wherein each of the one or more areas of the glyph defined by the portion of the analytical definition is one of (1) the one or more trapezoids or (2) the one or more curve segments.

17. One or more computer-readable non-transitory storage media embodying software that is operable when executed to cause one or more processors to perform operations comprising:

determining a pixel area in a display coordinate system, the pixel area being associated with a pixel;

projecting the pixel area into a three-dimensional coordinate system to determine a projected area in the three-dimensional coordinate system;

selecting, based on the projected area, a portion of a data structure that contains an analytical definition of a glyph in a two-dimensional coordinate system;

accessing a portion of the analytical definition associated with the selected portion of the data structure, the portion of the analytical definition defining one or more areas of the glyph;

projecting the portion of the analytical definition into the display coordinate system;

computing a coverage proportion of the pixel area that overlaps with one or more areas defined by the projected portion of the analytical definition;

determining a color for the pixel based on the coverage proportion; and rendering a display of the glyph based on the color.

18. The media of claim 17, wherein the analytical definition comprises definitions for one or more trapezoids having bases that are parallel to each other.

19. The media of claim 18, wherein the analytical definition comprises definitions for one or more curve segments, each of which being defined by an arc with two endpoints and a chord connecting the two endpoints.

20. The media of claim 19, wherein the glyph is formed by (1) assembling the one or more trapezoids and (2) for each of the one or more curve segments, assembling the curve segment with the one or more trapezoids or removing the curve segment from the one or more trapezoids.

* * * * *